(12) United States Patent
Matsui (10) Patent No.: US 10,805,141 B2
(45) Date of Patent: Oct. 13, 2020

(54) COMMUNICATION CONTROL DEVICE AND COMMUNICATION CONTROL SYSTEM

(71) Applicant: FUJITSU LIMITED, Kawasaki-shi, Kanagawa (JP)

(72) Inventor: Hideki Matsui, Kanazawa (JP)

(73) Assignee: FUJITSU LIMITED, Kawasaki (JP)

( * ) Notice: Subject to any disclaimer, the term of this patent is extended or adjusted under 35 U.S.C. 154(b) by 570 days.

(21) Appl. No.: 15/691,954

(22) Filed: Aug. 31, 2017

(65) Prior Publication Data

US 2018/0076998 A1 Mar. 15, 2018

(30) Foreign Application Priority Data

Sep. 12, 2016 (JP) ................. 2016-177517

(51) Int. Cl.
*H04L 27/34* (2006.01)
*H04L 27/20* (2006.01)
*H04B 7/14* (2006.01)
*H04L 27/26* (2006.01)
*H04L 27/00* (2006.01)

(52) U.S. Cl.
CPC .......... *H04L 27/3461* (2013.01); *H04B 7/14* (2013.01); *H04L 27/205* (2013.01); *H04L 27/2613* (2013.01); *H04L 2027/0083* (2013.01)

(58) Field of Classification Search
CPC ............... H04L 27/3461; H04L 27/205; H04L 27/2613; H04L 2027/0083; H04B 7/14
USPC .......................................................... 361/82
See application file for complete search history.

(56) References Cited

U.S. PATENT DOCUMENTS 9,684,332 B2 * 6/2017 Ogata .................. G06F 1/08

FOREIGN PATENT DOCUMENTS

JP 2002-111596 4/2002
WO 2010026757 A1 3/2010

OTHER PUBLICATIONS

Japanese Office Action dated Aug. 4, 2020 for corresponding Japanese Patent Application No. 2016-177517 with English Translation, 6 pages.

* cited by examiner

*Primary Examiner* — Dharti H Patel
(74) *Attorney, Agent, or Firm* — Fujitsu Patent Center (57) ABSTRACT

A generating unit that generates phase difference-added first data obtained by adding a phase change according to second data to a first signal indicating first data and a transmitting unit that transmits the phase difference-added first data are provided, and thus the first data and the second data can be transmitted through a simple configuration.

8 Claims, 7 Drawing Sheets

COMMUNICATION CONTROL DEVICE AND COMMUNICATION CONTROL SYSTEM

CROSS-REFERENCE TO RELATED APPLICATION

This application is based upon and claims the benefit of priority of the prior Japanese Patent application No. 2016-177517, filed on Sep. 12, 2016, the entire contents of which are incorporated herein by reference.

FIELD

The embodiment is directed to a communication control device and a communication control system.

BACKGROUND

In communication systems in which data communication is performed between devices, a method of transmitting a sub signal (sub data) such as a monitoring signal or control information along with a main signal (main data) such as operation data is known.

Figure 7:
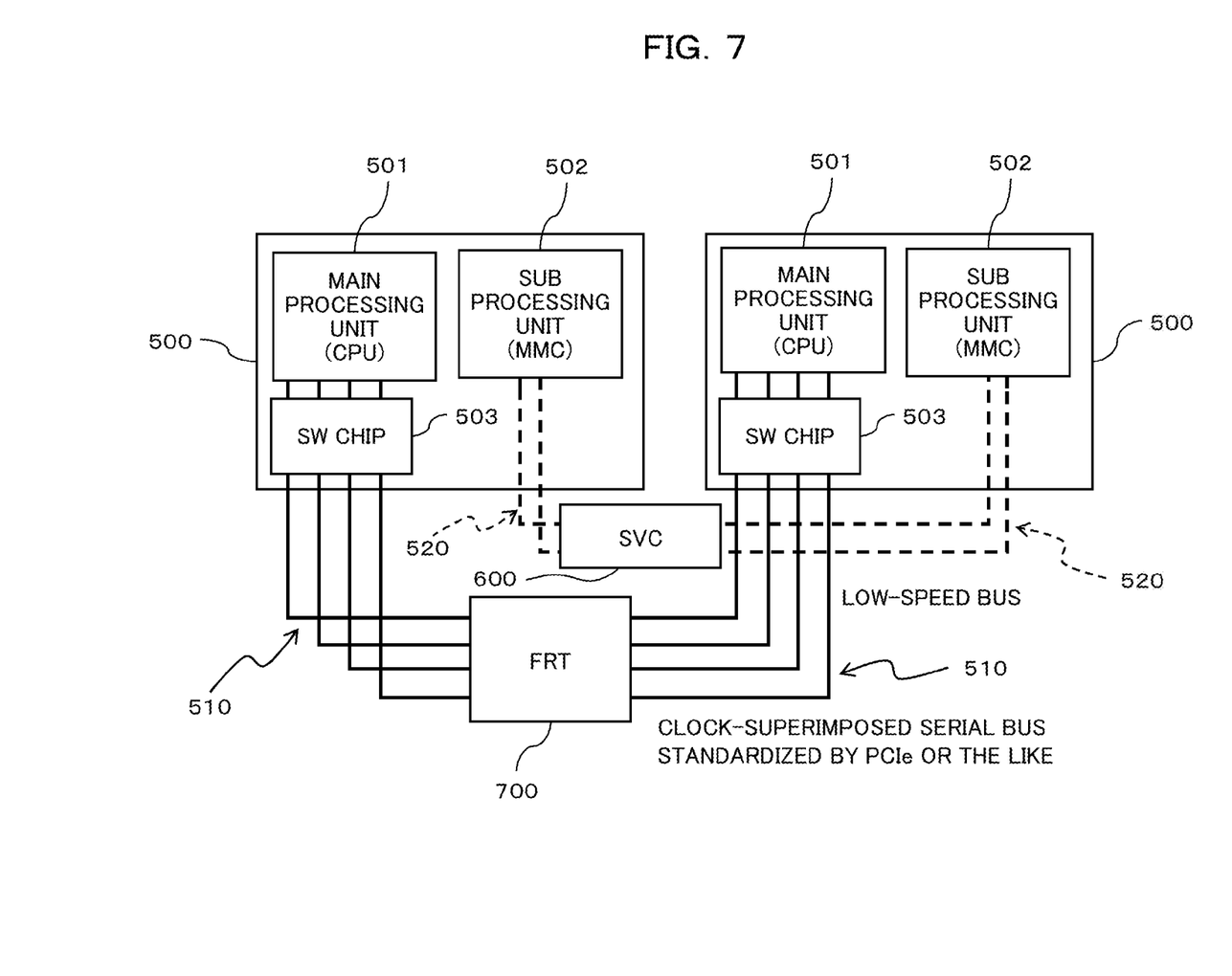
FIG. 7 is a diagram illustrating a communication system in a storage system according to a related art.

FIG. 7 is a diagram illustrating a communication system in a storage system according to a related art.

A storage system illustrated in FIG. 7 includes a service controller (SVC) 600, a front-end router (FRT) 700, and two controller modules (CM) 500.

Each of the CMs 500 includes a main processing unit 501, a sub processing unit 502, and a switch chip (SW chip) 503.

The main processing unit 501 performs an operation related to the main signal and performs communication control of the main signal. The main processing unit 501 is, for example, a central processing unit (CPU).

The sub processing unit 502 performs an operation related to the sub signal and performs communication control of the sub signal. The sub processing unit 502 is, for example, a module management controller (MMC).

The main processing units 501 of the CMs 500 are connected to a bus 510 via the switch chip 503, and the other end of the bus is connected to the FRT 700. In other words, the main processing units 501 of the CMs 500 are connected to communicate with each other via the switch chip 503, the bus 510, and the FRT 700.

The sub processing units 502 of the CMs 500 are connected to the SVC 600 via a bus 520. In other words, the sub processing units 502 of the CMs 500 are connected to communicate with each other via the bus 520 and the SVC 600.

The bus 510 providing a connection with the main processing units 501 via the FRT 700 is higher in speed than the bus 520, and a path connected via this bus 510 is referred to as an "inband path." On the other hand, a path connected via the bus 520 which is lower in speed than the bus 510 is referred to as an "outband path."

In the communication system illustrated in FIG. 7, the inband path and the outband path are provided to implement transmission and reception of the main signal and the sub signal.

Patent Literature 1: Japanese Laid-open Patent Publication No. 2002-111596A

However, in the communication system according to the related art, the inband path and the outband path are separately provided, leading to an increase in the number of cables. Accordingly, for example, there is a problem in that it is complicated to specify a suspicious position when a failure occurs.

SUMMARY

According to an aspect of the embodiments, a communication control device is a communication control device that transmits first data and second data and includes a generating unit that generates phase difference-added first data obtained by adding a phase change according to the second data to a first signal indicating the first data and a transmitting unit that transmits the phase difference-added first data.

The object and advantages of the invention will be realized and attained by means of the elements and combinations particularly pointed out in the claims. It is to be understood that both the foregoing general description and the following detailed description are exemplary and explanatory and are not restrictive of the invention.

DESCRIPTION OF EMBODIMENTS

Hereinafter, a communication control device and a communication control system according to an exemplary embodiment will be described with reference to the appended drawings. However, the following embodiment is merely an example, and there is no intention of excluding the application of various modified examples or techniques which are not explicitly described in the embodiment. In other words, the present embodiment can be implemented by various modifications (for example, a combination of an embodiment and each modified example) made within the scope not departing from the gist thereof. Further, the drawings are not intended to indicate one having only components illustrated in the drawing, but other functions or the like may be included.

(A) Configuration

Figure 1:
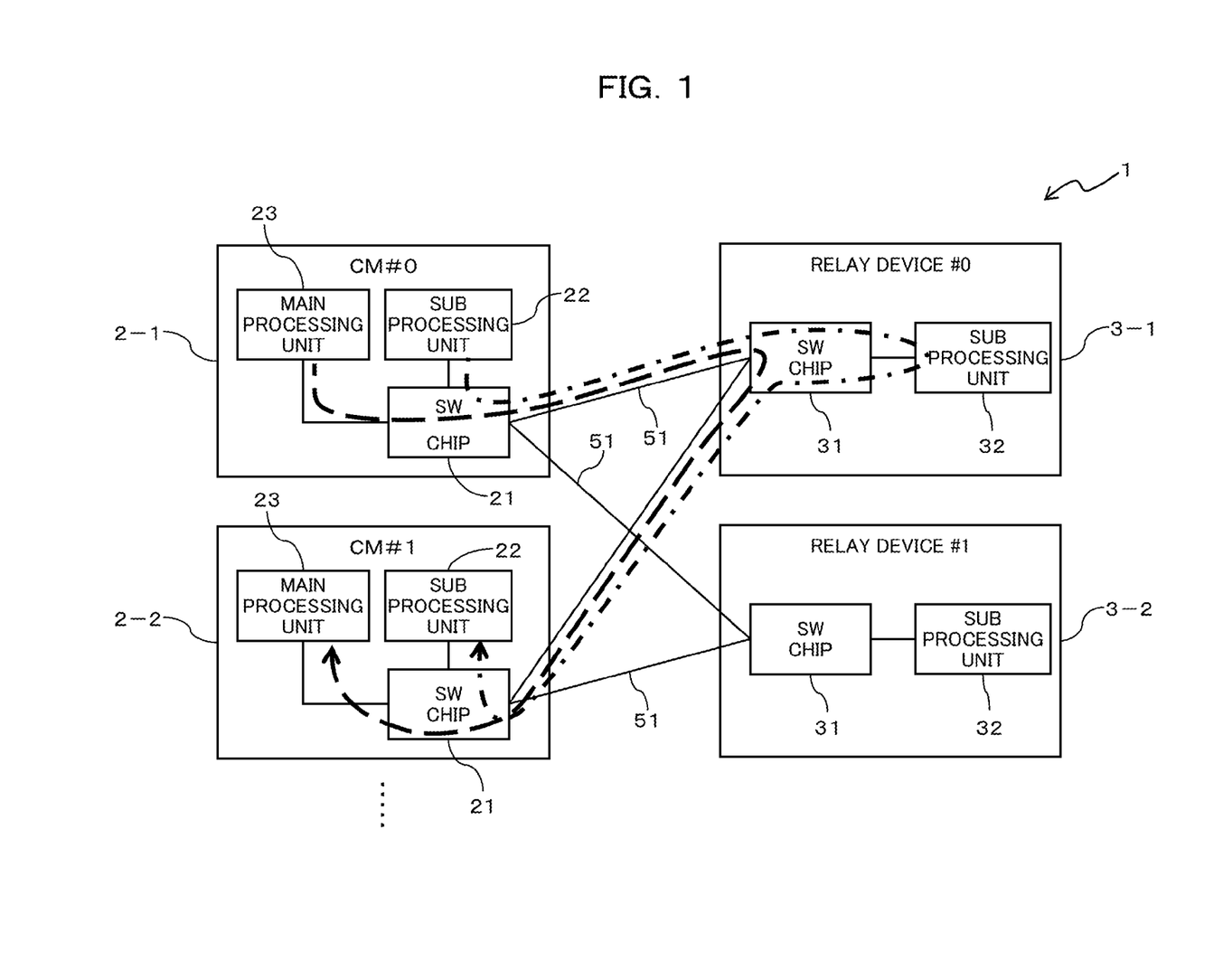
FIG. 1 is a diagram illustrating a connection configuration in a storage system which is an example of an embodiment.

FIG. 1 is a diagram illustrating a connection configuration in a storage system (communication control system) 1 which is an example of an embodiment.

In the example illustrated in FIG. 1, the storage system 1 includes CMs 2-1 and 2-2 (two CMs are illustrated in FIG. 1) and a plurality of relay devices 3-1 and 3-2 (two relay devices are illustrated in FIG. 1).

In the storage system 1, a plurality of CMs 2-1 and 2-2 and a plurality of relay devices 3-1 and 3-2 are connected by, for example, a communication cable (PCIe bus) 51 according to Peripheral Component Interconnect Express (PCIe).

In the present embodiment, as will be described later, a transmission signal including a main signal and a sub signal is communicated via the communication cable 51.

[1] CM

The CMs 2-1 and 2-2 are storage control devices that perform various controls in the storage system 1 and performs various kinds of controls such as access control to a storage device such as a hard disk drive (HDD) (not illustrated) in accordance with a storage access request transmitted from a host device. The CMs 2-1 and 2-2 have a similar configuration.

Hereinafter, reference numerals 2-1 and 2-2 are used when it is necessary to specify one of a plurality of CMs, but reference numeral 2 is used when pointing out an arbitrary CM.

Further, hereinafter, the CM 2-1 is also referred to as a "CM #0." Similarly, the CM 2-2 is also referred to as a "CM #1."

Each of the CMs 2 includes a main processing unit 23, a sub processing unit 22, and a switch chip (SW chip) 21 as illustrated in FIG. 1.

The main processing unit 23 performs processing such as an operation related to first data (main data) and performs an input and an output of a main signal in order to transfer the main data. The main processing unit 23 is, for example, a CPU.

The sub processing unit 22 performs processing such as operation related to second data (sub data) and performs an input and an output of a sub signal in order to transfer the sub data. The sub processing unit 22 is, for example, an MMC.

The main processing unit 23 and the sub processing unit 22 are connected to the communication cable 51 via the switch chip 21, and the other end of the communication cable 51 is connected to switch chips 31 of the relay devices 3-1 and 3-2.

The communication cable 51 has a plurality of communication paths therein. Hereinafter, paths included in the communication cable 51 are also referred to as lanes 223a and 223b (see FIG. 2).

Figure 2:
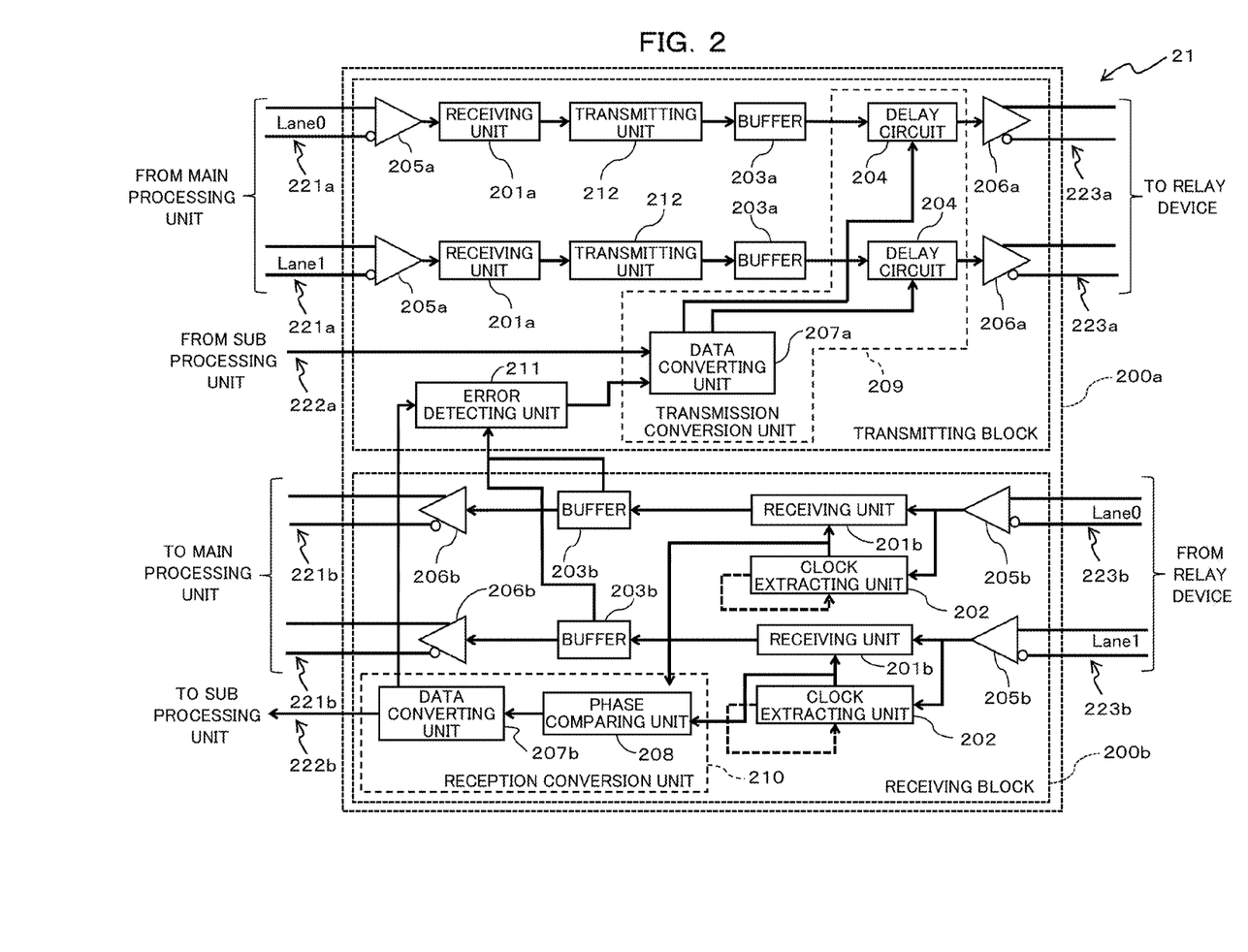
FIG. 2 is a diagram illustrating a configuration of a switch chip in a storage system which is an example of an embodiment.

Further, the main processing unit 23 and the switch chip 21 are connected by lanes 221a and 221b (see FIG. 2).

The switch chip 21 is a connection device that establishes a connection so that the CM 2 in which the switch chip 21 is installed (hereinafter referred to as its own CM 2) is able to perform communication with another CM 2 via the communication cable 51 and the relay device 3.

The switch chip 21 functions as a communication control device that transmits the first data (main data) transmitted from the main processing unit 23 and the second data (sub data) transmitted from the sub processing unit 22.

The switch chip 21 is connected to the switch chips 31 of the relay devices 3-1 and 3-2 via the communication cable 51.

Accordingly, the main processing unit 23 of the CM 2-1 is communicably connected to the main processing unit 23 of the CM 2-2 via the switch chip 21, the communication cable 51, and the relay device 3.

Similarly, the sub processing unit 22 of the CM 2-1 is communicably connected to the sub processing unit 22 of the CM 2-2 via the switch chip 21, the communication cable 51, and the relay device 3.

FIG. 2 is a diagram illustrating a configuration of the switch chip 21 in the storage system 1 which is an example of the embodiment.

The switch chip 21 includes a transmitting block 200a and a receiving block 200b as illustrated in FIG. 2.

The transmitting block 200a processes transmission of data (signal) from its own CM 2 to the relay device 3. On the other hand, the receiving block 200b processes reception of data (signal) transmitted from the relay device 3 to its own CM 2.

(a) Transmitting Block

The main signal from the main processing unit 23 of its own CM 2 is input to the transmitting block 200a via one or more lanes 221a (two lanes 0 and 1 in the example illustrated in FIG. 2). Further, the sub signal from the sub processing unit 22 of its own CM 2 is input to the transmitting block 200a via one or more general-purpose buses 222a (one bus in the example illustrated in FIG. 2).

As will be described later, the transmission signal including the main signal and the sub signal is output from the transmitting block 200a to the relay device 3 via one or more lanes 223a (two lanes in the example illustrated in FIG. 2).

On the other hand, the transmission signal including the main signal and the sub signal is input from the relay device 3 to the receiving block 200b via one or more lane 223b (two lanes 0 and 1 in the example illustrated in FIG. 2).

Then, the receiving block 200b outputs the main signal to the main processing unit 23 of its own CM 2 via one or more lanes 221b (two lanes in the example illustrated in FIG. 2). Further, the receiving block 200b outputs the sub signal to the sub processing unit 22 of its own CM 2 via one or more general-purpose bus 222b (one bus in the example illustrated in FIG. 2).

The lanes 221a, 221b, 223a, and 223b are serial buses and transmit a clock-superimposed signal (transmission signal) as will be described later.

The transmitting block 200a includes a receiving unit 201a, a transmitting unit 212, a buffer 203a, an input port 205a, an output port 206a, a delay circuit 204, an error detecting unit 211, and a data converting unit 207a as illustrated in FIG. 2.

Among the above-mentioned components, the receiving unit 201a, the transmitting unit 212, the buffer 203a, the input port 205a, the output port 206a, and the delay circuit 204 are provided for each lane 221a (223a).

As will be described later, among the above-mentioned components, the delay circuit 204 and the data converting unit 207a constitutes a transmission conversion unit 209 that adds the sub signal to the main signal as a skew difference (a phase difference or a phase change) and generates a skew difference-added main signal (phase difference-added first data).

The lane 221a providing a connection with the main processing unit 23 is connected to the input port 205a, and the main signal output from the main processing unit 23 is input to the input port 205a via the lane 221a.

The lane 223a providing a connection with the relay device 3 is connected to the output port 206a, and the transmission signal output to the relay device 3 is output to the output port 206a via the lane 223a.

The main signal input to the input port 205a is input to the receiving unit 201a. The receiving unit 201a receives the main signal input to the input port 205a. The main signal received by the receiving unit 201a is input to the transmitting unit 212.

The transmitting unit 212 causes a transmission clock signal to be superimposed on the input main signal. The main signal on which the transmission clock signal is superimposed is stored in the buffer 203a. Hereinafter, the main signal on which the transmission clock signal is superimposed is referred to as a "clock-superimposed main signal" or simply as a "main signal." Further, the transmission clock signal may be referred to simply as a "clock signal."

The buffer 203a is a first in, first out (FIFO) memory that temporarily stores the transmission signal (main signal) to be transmitted to the relay device 3.

The error detecting unit 211 detects an error related to each of buffers 203b of the receiving block 200b which will be described later.

For example, upon receiving an error notification (a buffer underrun error) from any of the buffers 203b of the receiving block 200b to be described later in its own CM 2, the error detecting unit 211 gives a notification (a first buffer underrun detection notification) to the data converting unit 207a. The error detecting unit 211 requests the data converting unit 207a to transmit an error notification (a second buffer underrun detection notification) for the transmitting block 200a of the CM 2 of a transmission source of the transmission signal in the lane 223b in which the buffer underrun error occurs.

Further, upon receiving the second buffer underrun error detection notification indicating that the buffer underrun error has occurred from the transmitting block 200a of another CM 2, the error detecting unit 211 gives a notification (second buffer underrun error reception notification) to the data converting unit 207a.

The data converting unit 207a converts the sub signal input from the sub processing unit 22 via the general-purpose bus 222a into a waveform signal (a first waveform signal) such as a 1-wire serial signal.

Further, the data converting unit 207a converts the sub signal input from the sub processing unit 22 into a waveform signal (skew) used for the delay circuit 204 to partially incur a skew difference (a phase shift or a delay) in the main signal (a skew difference control waveform signal or a phase change control signal).

In other words, the data converting unit 207a functions as a first generating unit that generates the phase change control signal (the skew difference control waveform signal) on the basis of the sub signal (second data).

Figure 3:
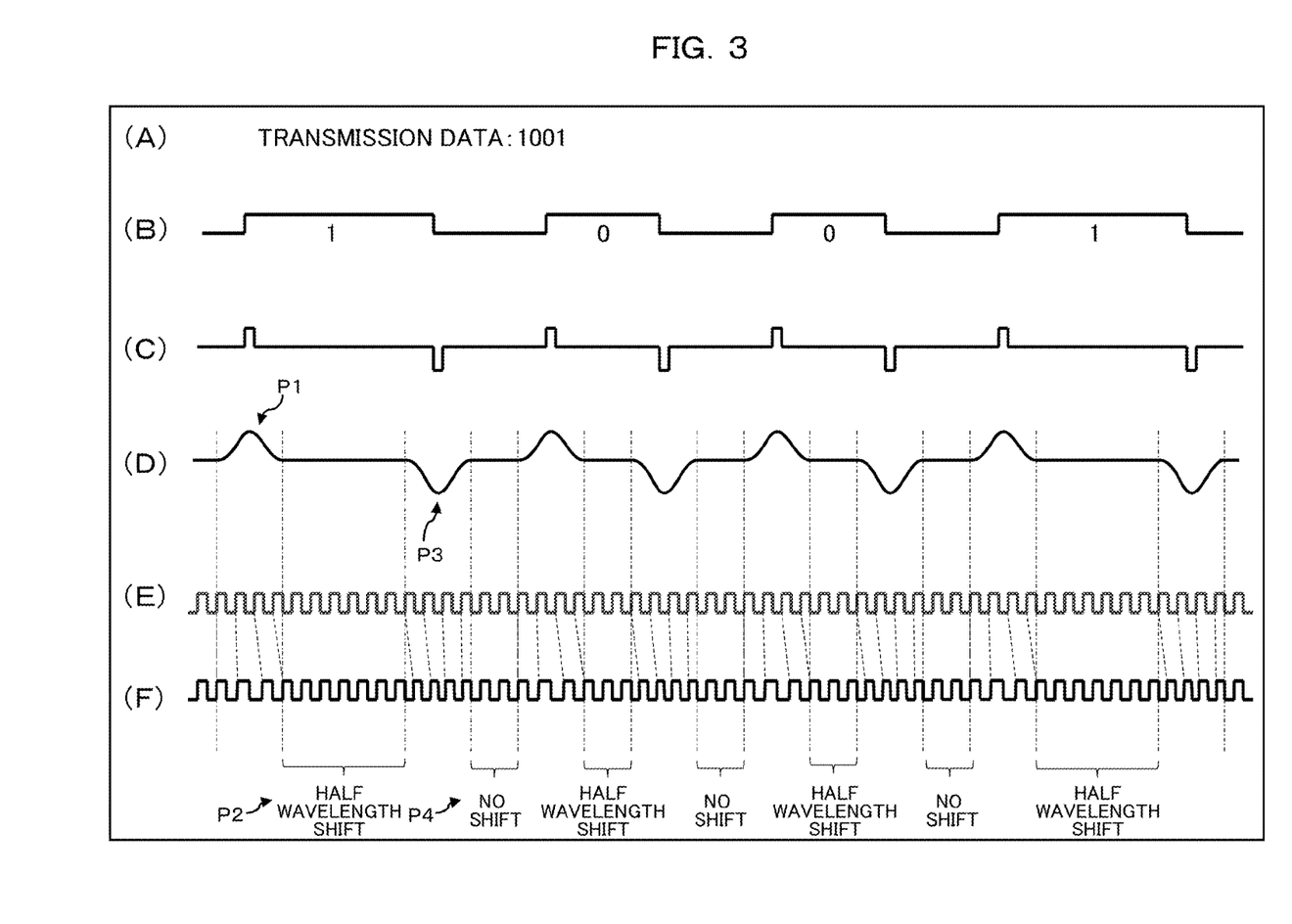
FIG. 3 is a diagram for describing a method of generating a transmission signal in a storage system which is an example of an embodiment.

FIG. 3 is a diagram for describing a method of generating the transmission signal in the storage system 1 which is an example of the embodiment.

In FIG. 3, reference numeral (A) illustrates an example of the sub data (transmission data). In this example, the sub data is "1001."

The data converting unit 207a converts the sub data into waveform data (the sub signal) illustrates by reference numeral (B) in FIG. 3 (a first data conversion process). In the example illustrates by the reference numeral (B), an example in which the sub signal is converted into a 1-wire serial format (1-wire serial signal) is illustrated. In the 1-wire serial signal, a state in which a HIGH time is longer than a predetermined threshold value is referred to as "1."

Further, the data converting unit 207a extracts an edge from the waveform data converted into the 1-wire serial signal as illustrated by reference numeral (C) in FIG. 3 (a second data conversion process). The edge extraction can be implemented using various known techniques, and description thereof will be omitted.

The data converting unit 207a performs shaping by deadening a waveform to be smooth using a low-pass filter (LPF) or the like as illustrated by reference numeral (D) in FIG. 3 so that there is no influence on serial transmission by the main processing unit 23 (a third data conversion process). The waveform signal generated as described above is used for giving a skew difference by the delay circuit 204 to be described later. Hereinafter, the waveform signal generated by the data converting unit 207a on the basis of the sub signal input from the sub processing unit 22 is also referred to as a "skew difference control waveform signal."

Further, the data converting unit 207a has a function of suspending transmission of the transmission signal using the lanes 223a and 223b in which the buffer underrun error is detected when the buffer underrun error is detected in the receiving block 200b to be described later.

In a specific system, when the second buffer underrun error reception notification is received from the error detecting unit 211, that is, the notification (the second buffer underrun error detection notification) indicating that the buffer underrun error occurs is given from the transmitting block 200a of another CM 2, the data converting unit 207a prevents the use of the lane in which the buffer underrun error occurs.

Further, even when the first buffer underrun detection notification is received from the error detecting unit 211, that is, even when the error notification (the buffer underrun error) is given from any one of the buffers 203b of the receiving block 200b of its own CM 2, the data converting unit 207a prevents the use of the lane in which the buffer underrun error occurs.

Then, the data converting unit 207a selects another lane 223a in which an error is not detected in place of the lane 223a which is prevented from being used, and transmits the transmission signal.

The delay circuit 204 adds the skew difference to the clock-superimposed main signal read from the buffer 203a on the basis of the skew difference control waveform signal generated by the data converting unit 207a. Here, the "skew difference" refers to a phase difference of the waveform.

For example, the delay circuit 204 partially shifts the phase by partially delaying the main signal in accordance with the waveform of the skew difference control waveform signal. Hereinafter, the main signal to which the phase shift (the skew difference) is added is also referred to as a "skew difference-added main signal (phase difference-added first data)."

Thus, in the skew difference-added main signal, the delay circuit 204 generates a phase-shifted part and a non-phase-shifted part as compared with the main signal to which the phase shift is not added.

The skew difference-added main signal can be regarded as being a phase change signal having a phase-shifted part and a non-phase-shifted part with respect to the sub signal.

Therefore, the delay circuit 204 functions as an generating unit that generates the phase difference-added first data (the skew difference-added main signal) obtained by adding the phase change (the skew difference) according to the second data (the sub signal) to the first signal (main signal).

In FIG. 3, reference numeral (E) illustrates the waveform of the main signal (the clock-superimposed main signal) to which the skew difference is not added, and reference numeral (F) illustrates the waveform of the skew difference-added main signal. In other words, reference numeral (F) illustrates the waveform of the skew difference-added main signal in a state in which the phase shift according to skew difference control waveform signal is added.

The delay circuit 204 causes the clock-superimposed main signal read from the buffer 203a to become, for example, a state in which a phase of an interval corresponding to HIGH (1) is delayed in the skew difference control waveform signal. In the examples illustrated by reference numerals (B) and (F) in FIG. 3, the delay circuit 204 causes the main signal of the interval corresponding to HIGH (1) in the sub signal (the 1-wire serial signal) to become a half wavelength-shifted state (a half wavelength-delayed state).

Further, the delay circuit 204 causes the clock-superimposed main signal to become a state in which the main signal of an interval corresponding to LOW (0) in the sub signal (the 1-wire serial signal) has no wavelength shift.

For this reason, for example, the delay circuit 204 causes a delay to occur in a part protruding to an + side (a HIGH side) (see reference numeral P1 in FIG. 3) in the skew difference control waveform signal (see reference numeral (D) in FIG. 3).

Accordingly, the delay circuit 204 causes the main signal corresponding to the succeeding part to become a half wavelength-shifted state (see reference numeral P2 in FIG. 3). Further, the delay circuit 204 advance a phase in order to eliminate a delay in a part protruding to a − side (a LOW side) (see reference numeral P3 in FIG. 3) in the skew difference control waveform signal (see reference numeral (D) in FIG. 3). Accordingly, the delay circuit 204 causes the main signal corresponding to a subsequent part to become a non-shifted state (refer to reference numeral P4 in FIG. 3).

Further, the delay circuit 204 causes a phase difference to occur in the main signal in a range in which the buffer 203b (an elastic buffer) arranged in the receiving block 200b of the switch chip 21 can absorb the phase difference (delay).

Thus, the delay circuit 204 generates the skew difference-added main signal in which the main signal of the interval corresponding to HIGH (1) in the sub signal (the 1-wire serial signal) becomes the half wavelength-shifted state (the half wavelength-delayed state).

In other words, the delay circuit 204 adds a phase change (a skew difference) corresponding to the skew difference control waveform signal (the phase change control signal) to the main signal.

A clock signal is superimposed on the skew difference-added main signal, and a skew difference added by the delay circuit 204 is also added to the clock signal. Hereinafter, the clock signal, to which the skew difference is added, included in the clock-superimposed main signal is also referred to as a "skew difference-added clock signal."

As described above, in the skew difference-added main signal, the sub signal is included in (added to) the main signal as the skew difference (the phase shift). Similarly, in the skew difference-added clock signal, the sub signal is included in (added to) to the clock signal as the skew difference (the phase shift).

In FIG. 3, in the example indicated by reference numeral (F), several wavelengths are seen a shifted part for the sake of convenience of scaling, but practically, a shift occurs at the level of 1,000 to 10,000 wavelengths, and a difference between a high frequency part and a low frequency part in the transmission signal becomes apparent.

The delay circuit 204 transmits the skew difference-added main signal generated as described above to the relay device 3 as the transmission signal via the output port 206a. Therefore, the output port 206a or the delay circuit 204 functions as a transmitting unit that transmits the skew difference-added main signal (the phase difference-added first data).

As described above, in the storage system 1, in the transmission signal transmitted from the transmitting block 200a of the switch chip 21, the skew difference corresponding to the sub signal is added to the main signal. In other words, in transmission signal, the sub signal is added to the main signal using the skew difference.

(b) Receiving Block

A transmission signal from the relay device 3 is input to the receiving block 200b via one or more lanes 223b (two lanes in the example illustrated in FIG. 2). As described above, in this transmission signal, the sub signal is added to the main signal using the skew difference, and the receiving block 200b extracts the main signal and the sub signal from the received transmission signal.

The receiving block 200b inputs the main signal extracted from the transmission signal to the main processing unit 23 via one or more lane 221b (two lanes in the example illustrated in FIG. 2). The receiving block 200b extracts the sub signal from the transmission signal and inputs the extracted sub signal to the sub processing unit 22 via one or more general-purpose bus 222b (one general-purpose bus in the example illustrated in FIG. 2).

The lane 223b is a serial bus similar to the lane 223a and transmits the clock-superimposed signal (the transmission signal).

The receiving block 200b includes a receiving unit 201b, a clock extracting unit 202, a buffer 203b, an input port 205b, an output port 206b, a phase comparing unit 208, and a data converting unit 207b as illustrated in FIG. 2.

Among the above-mentioned components, the receiving unit 201b, the clock extracting unit 202, the buffer 203b, the input port 205b, and the output port 206b are provided for each lane 221b (223b).

Among the above-mentioned components, the data converting unit 207b and the phase comparing unit 208 constitute a reception conversion unit 210 that extracts the sub signal from the received skew difference-added main signal as will be described later.

The lane 223b providing a connection with the relay device 3 is connected to the input port 205b, and the transmission signal transmitted from the relay device 3 is input to the input port 205b via the lane 223b.

The lane 221b providing a connection with the main processing unit 23 is connected to the output port 206b, and the transmission signal output to the main processing unit 23 is output to the output port 206b via the lane 221b.

The transmission signal input to the input port 205b is input to the receiving unit 201b and the clock extracting unit 202.

The receiving unit 201b receives the transmission signal input to the input port 205b. The receiving unit 201b extracts the main signal from the received transmission signal. The main signal extracted by the receiving unit 201b is stored in the buffer 203b.

Therefore, the receiving unit 201b functions as a receiving unit that receives the skew difference-added main signal (the phase difference-added first data).

The buffer 203b is a FIFO memory which temporarily stores the transmission signal (the main signal) received by the receiving unit 201b. The buffer 203b functions as an elastic buffer that compensates for a phase deviation (a phase shift) and a frequency deviation between signals input from a plurality of lanes 223b. In other words, the buffer 203b functions as a delay absorbing unit that absorbs the delay of the transmission signal.

When the buffer 203b becomes the buffer underrun state, that is, when the buffer 203b becomes a state in which written data is smaller than an amount necessary in the buffer region (a buffer exhaustion state), the buffer 203b gives the error notification (the buffer underrun error) to the error detecting unit 211 of the transmitting block 200a of its own CM2.

The main signal stored in the buffer 203b is input to the main processing unit 23 via the output port 206b and the lane 221b.

The clock extracting unit 202 extracts the clock signal from the received transmission signal. The extraction of the clock from the transmission signal can be implemented using various known methods, and thus detailed description thereof is omitted.

The clock signal extracted by the clock extracting unit 202 is input to the receiving unit 201b and the phase comparing unit 208. In the example illustrated in FIG. 2, the clock signal is input from each clock extracting units 202 arranged in each of a plurality of lanes 223b to the receiving unit 201b and the phase comparing unit 208 of the reception conversion unit 210. The skew difference corresponding to the sub signal is added to the clock signal (the skew difference-added clock signal) extracted from the transmission signal by the clock extracting unit 202 by the delay circuit 204 as described above.

The reception conversion unit 210 restores the sub signal from the skew difference-added clock signal. Accordingly, the reception conversion unit 210 functions as a restoring unit that restores the sub signal from the received skew difference-added main signal (the phase difference-added first data).

The reception conversion unit 210 includes the phase comparing unit 208 and the data converting unit 207b.

The phase comparing unit 208 extracts the skew difference control waveform signal from the skew difference-added clock signal.

Figure 4:
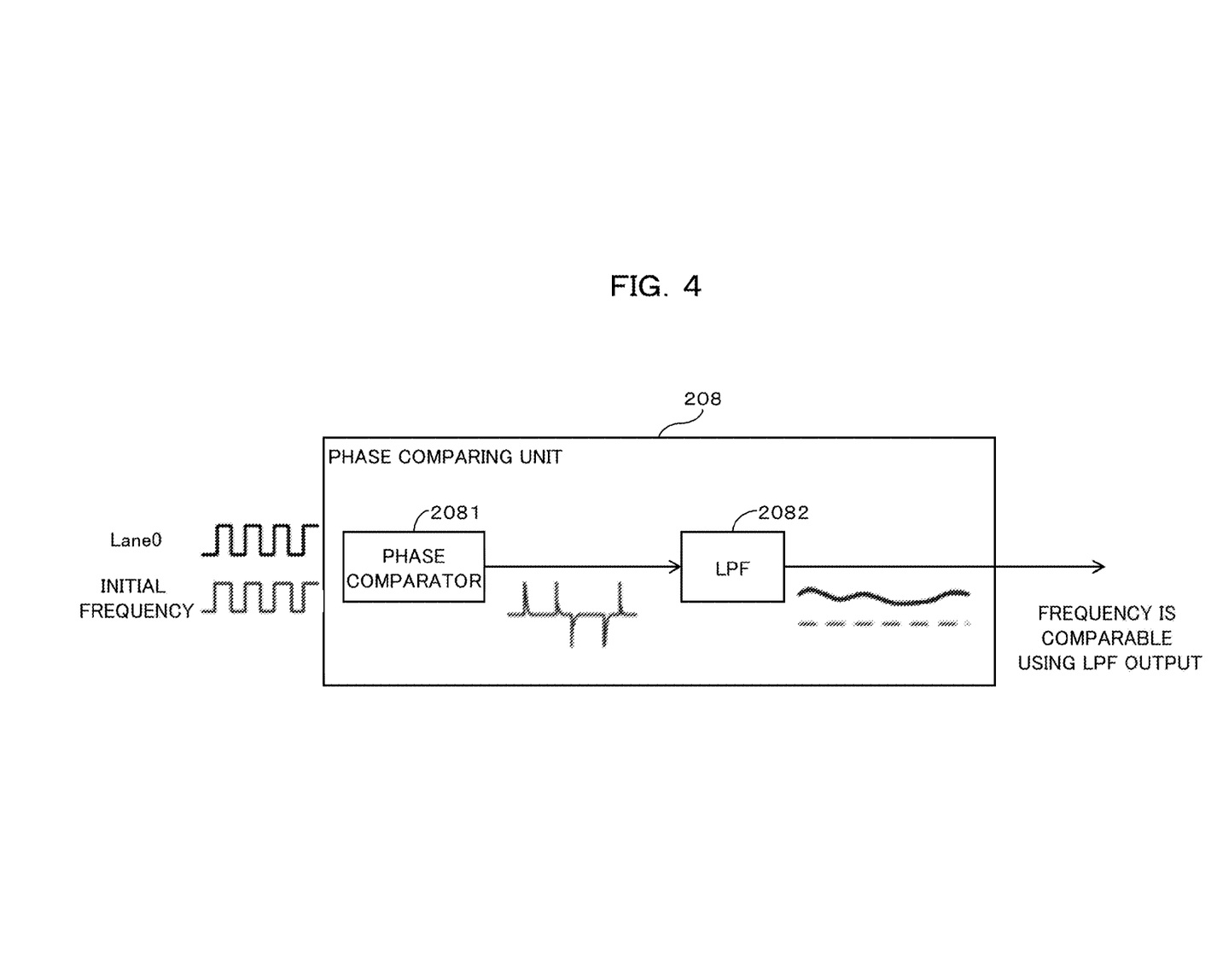
FIG. 4 is a diagram illustrating a configuration of a phase comparing unit in a storage system which is an example of an embodiment.

FIG. 4 is a diagram illustrating a configuration of the phase comparing unit 208 in the storage system 1 which is an example of the embodiment.

The phase comparing unit 208 includes a phase comparator 2081 and an LPF 2082 as illustrated in FIG. 4.

The phase comparator 2081 compares the reference clock signal with the skew difference-added clock signal extracted by the clock extracting unit 202 to detect the phase shift and is implemented by, for example, an XOR circuit.

For the reference clock signal, for example, a clock signal having a state in which the skew difference is not applied is input for a predetermined period (for example, 10 seconds) when the storage system 1 is activated, and a frequency and a phase thereof are stored in a memory (not illustrated). The reference clock signal indicates an initial frequency of the clock signal.

Figure 5:
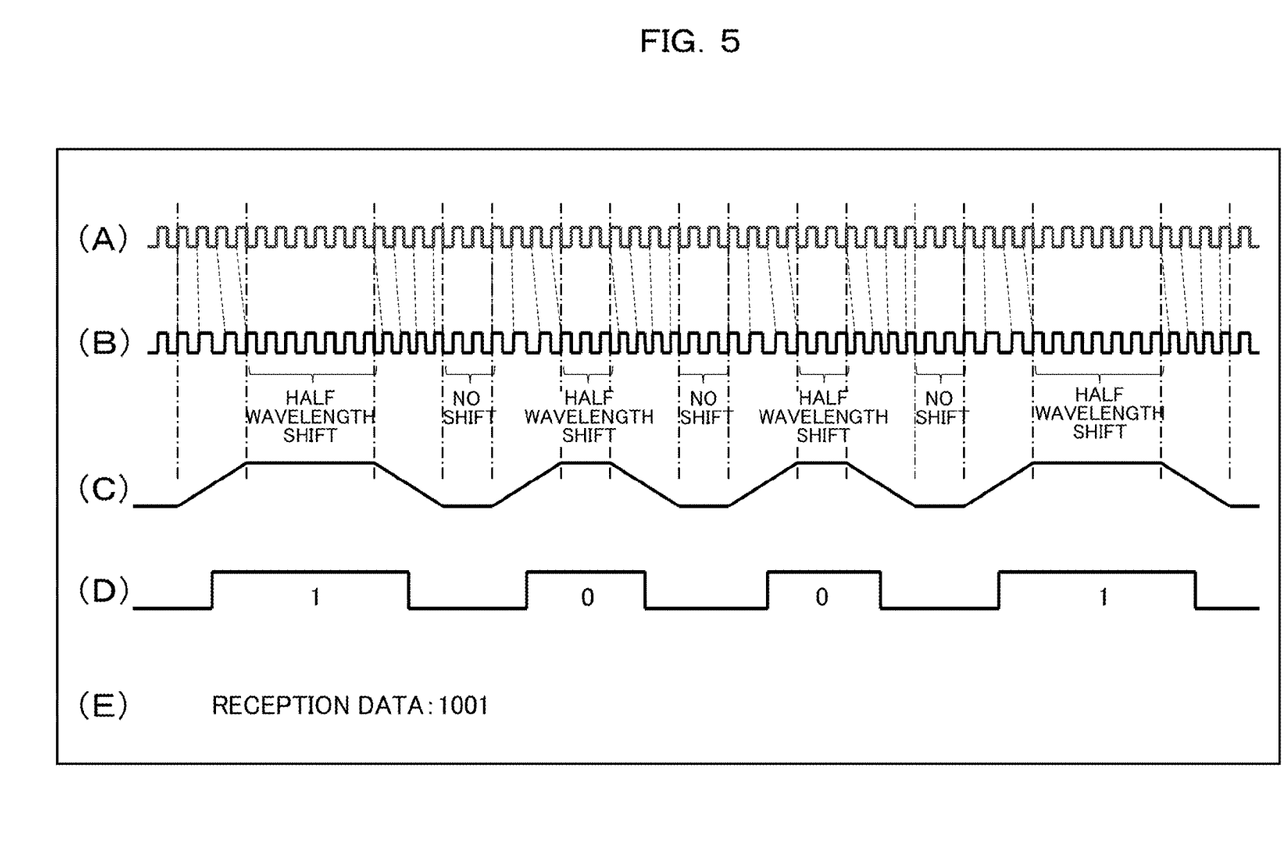
FIG. 5 is a diagram for describing a method of processing a skew difference-added clock signal in a storage system which is an example of an embodiment.

FIG. 5 is a diagram for describing a method of processing the skew difference-added clock signal in the storage system 1 which is an example of the embodiment.

In FIG. 5, reference numeral (A) illustrates the reference clock signal, reference numeral (B) illustrates the skew difference-added clock signal, and reference numeral (C) illustrates an output signal of the phase comparing unit 208. Reference numeral (D) illustrates the 1-wire serial signal generated by the data converting unit 207b, and reference numeral (E) illustrates a data example of the sub signal.

The phase comparator 2081 detects a phase difference between the reference clock signal (see reference numeral (A) in FIG. 5) and the skew difference-added clock signal (see reference numeral (B) in FIG. 5) and generates a voltage signal according to the phase difference. For example, the phase comparator 2081 outputs HIGH when the phase of the skew difference-added clock signal is ahead of the phase of the reference clock signal.

The LPF 2082 is arranged on the downstream side of the phase comparator 2081, and a signal output from the phase comparator 2081 is averaged (smoothed) by the LPF 2082 and outputted (see reference numeral (C) in FIG. 5). Hereinafter, a phase comparison result of the skew difference-added clock signal and the reference clock signal smoothed by the LPF 2082 is also referred to as "phase comparison information."

The phase comparing unit 208 compares the skew difference-added clock signal with the reference clock signal and generates the phase comparison information.

Therefore, the data converting unit 207b has a function of generating a waveform signal according to a phase shift between the skew difference-added clock signal (the clock signal to which the phase change is added) extracted from the skew difference-added main signal (the phase difference-added first data) and the reference clock signal.

The data converting unit 207b converts the signal (the phase comparison information) input from the phase comparing unit 208 into a general-purpose bus signal (sub data) acquired by the sub processing unit 22.

The data converting unit 207b shapes the waveform data (the phase comparison information) generated by the phase comparing unit 208 and generates the 1-wire serial signal. For example, the data converting unit 207b binarizes the phase comparison information by dividing it by a predetermined threshold value and generates the 1-wire serial signal (the sub signal) (see reference numeral (D) in FIG. 5).

Then, the data converting unit 207b digitizes the sub signal indicated as the 1-wire serial signal and acquires the sub data (refer to reference numeral (E) in FIG. 5). In the example illustrated by reference sign (E) in FIG. 5, sub data "1001" is acquired. The acquired sub data is input to the sub processing unit 22 via the general-purpose bus 222b.

Further, the data converting unit 207b has a function of determining a phase shift caused by a normal disturbance and a frequency shift (that is, the sub signal) caused by addition of the skew difference by the delay circuit 204 using a threshold value for an output of the phase comparing unit 208.

Figure 6:
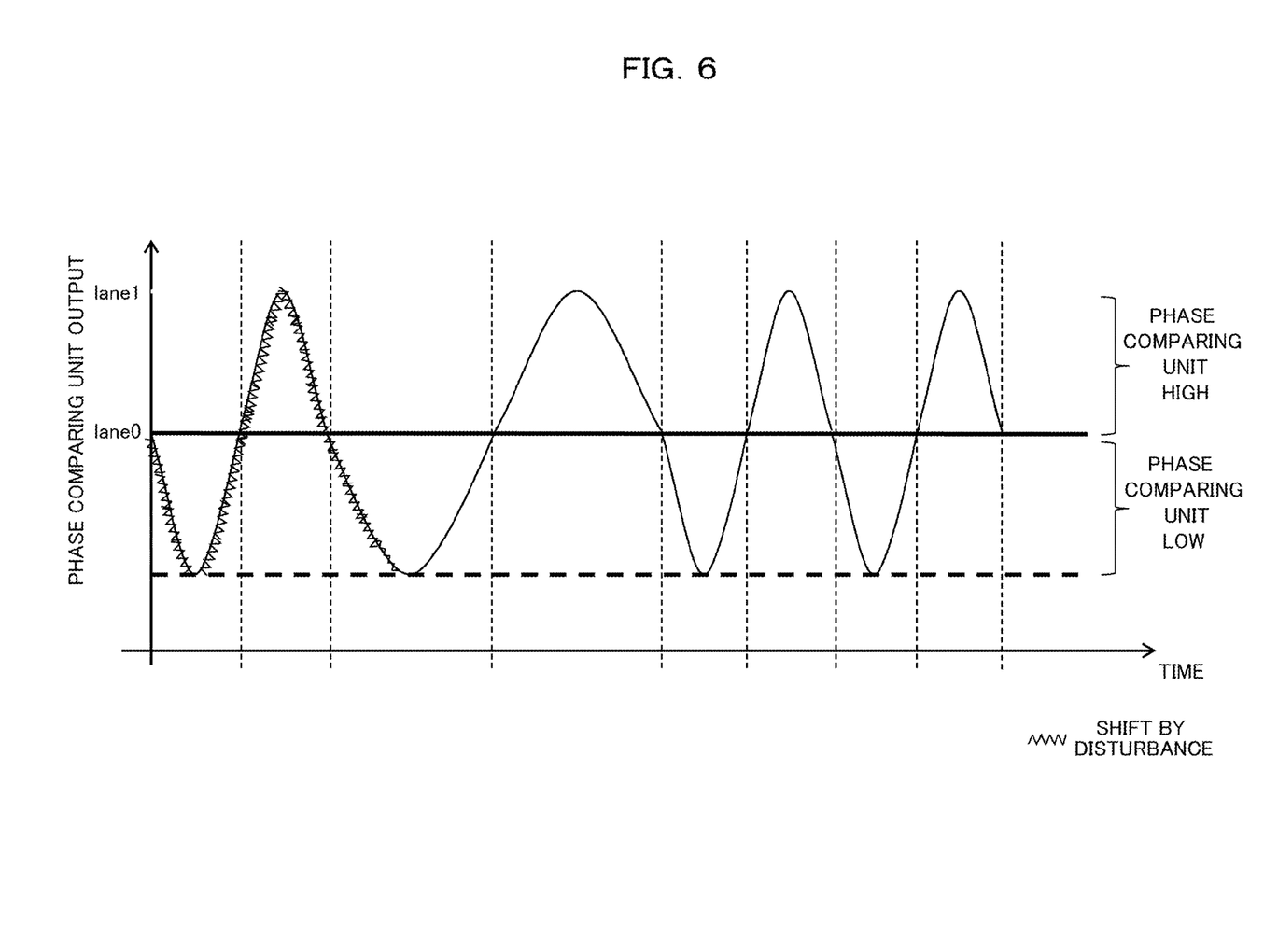
FIG. 6 is a diagram for describing a shift determining process by a data converting unit in a storage system as an example of an embodiment.

FIG. 6 is a diagram for describing a shift determination process by the data converting unit 207b in the storage system 1 which is as an example of the embodiment. FIG. 6 illustrates an output signal from the phase comparing unit 208, and a shift caused by a disturbance is partially illustrated in the output signal.

For example, in the case of PCIe, for example, a frequency shift of up to 0.03% is permitted in a standard. Further, a shift of 3% is permitted when spread-spectrum clocking (SSC) is applied. On the other hand, it is possible to shift the phase of the elastic buffer by a maximum of about 1,000% (10 wavelengths). In the example illustrated in FIG. 6, the waveform in which a phase shift of 50% (a half wavelength) has occurred is illustrated.

By setting an appropriate threshold value (for example, 20%) and performing filtering, it is possible to sufficiently remove a shift caused by a disturbance or a shift caused by the SSC.

[2] Relay Device

The relay devices 3-1 and 3-2 are communication devices that implement communication (inter-CM communication) between a plurality of CMs 2-1 and 2-2. The relay devices 3-1 and 3-2 have a similar configuration.

Hereinafter, reference numerals 3-1 and 3-2 are used when it is necessary to specify one of a plurality of relay devices, but reference numeral 3 is used when pointing out an arbitrary relay device.

Hereinafter, the relay device 3-1 is also referred to as a "relay device #0." Similarly, the relay device 3-2 is also referred to as a "relay device #1."

In the example illustrated in FIG. 1, each of the relay devices 3 includes a switch chip (SW chip) 31 and a sub processing unit 32.

The switch chip 31 is a circuit device that switches a data communication path, and causes data inputted via the communication cable 51 connected to a first connector (not illustrated) to be output from another communication cable 51 connected to a second connector in accordance with a transmission destination (a communication counterpart) of the data. Accordingly, the relay device 3 implements a function of the FRT.

Further, the switch chip 31 has a function similar to the receiving block 200b and the transmitting block 200a of the switch chip 21 of the CM 2.

In other words, the switch chip 31 receives the transmission signal, to which the sub signal is added to the main signal as the skew difference, transmitted from the CM2, and extracts the main signal and the sub signal from the transmission signal. The sub signal extracted in the switch chip 31 is transferred to the sub processing unit 32.

The sub processing unit 32 performs an operation related to the sub signal and performs communication control of the sub signal. In the relay device 3, the sub processing unit 32 implements a function of the SVC.

The sub signal output from the sub processing unit 32 is transferred to the switch chip 31, added to the clock signal as the skew difference by the function of the switch chip 31, and transmitted to the CM 2.

(B) Operation

A data transmission/reception method between the CMs 2 in the storage system 1 having the above-described configuration which is an example of the embodiment will be described. An example of transmitting data from the CM #0 to the CM #1 via the relay device #0 will be described below.

In the CM #0 of the data transmission source, the main processing unit 23 inputs the main signal to the switch chip 21 via the lane 221a.

The main signal from the main processing unit 23 is input to each input port 205a from each lane 221a. The main signal input to the input port 205a is input to the receiving unit 201a.

The receiving unit 201a to which the main signal is inputted inputs the main signal to the transmitting unit 212. In the transmitting unit 212, the transmission clock signal is superimposed on the input main signal. The main signal (the clock-superimposed main signal) on which the transmission clock signal is superimposed is stored in the buffer 203a.

On the other hand, the sub processing unit 22 inputs the sub signal to the switch chip 21 via the general-purpose bus 222a. The sub signal input via the general-purpose bus 222a is input to the data converting unit 207a of the transmission conversion unit 209.

The data converting unit 207a converts the data input via the general-purpose bus 222a into a 1-wire serial signal and then generates the skew difference control waveform signal. The generated skew difference control waveform signal is input to the delay circuit 204.

The delay circuit 204 generates the skew difference-added main signal by adding the skew difference to the clock-superimposed main signal read from the buffer 203 on the basis of the skew difference control waveform signal generated by the data converting unit 207a.

The delay circuit 204 transmits the generated skew difference-added main signal to the relay device 3 as the transmission signal via the lane 223a.

In the relay device 3, the switch chip 31 extracts the main signal and the sub signal from the input transmission signal.

In other words, the switch chip 31 extracts the clock signal (the skew difference-added clock signal) from the input transmission signal, similarly to the receiving block 200b of the switch chip 21. The switch chip 31 compares the skew difference-added clock signal with the reference clock signal, detects the phase shift, converts it into a waveform, smooths it, and generates waveform data.

Then, the switch chip 31 generates the 1-wire serial signal on the basis of the generated waveform data, and then generates (extracts) the sub signal on the basis of the 1-wire serial signal.

The extracted sub signal is input to the sub processing unit 32 and processed in the sub processing unit 32.

Further, the switch chip 31 outputs the main signal extracted from the transmission signal to the CM #1 serving as the transmission destination thereof using the function of the FRT.

The relay device 3 generates the skew difference-added main signal by adding the skew difference to the main signal (the clock-superimposed main signal) to be transmitted to the CM #1 on the basis of the skew difference control waveform signal generated on the basis of the sub signal generated by the sub processing unit 32. The skew difference-added main signal is generated by a technique similar to that of the transmission conversion unit 209 of the transmitting block 200a of the switch chip 21 of the CM 2.

The relay device 3 may transfer the transmission signal transmitted from CM #0 to the CM #1 without change. In other words, instead of adding the skew difference to the main signal (the clock-superimposed main signal) on the basis of the skew difference control waveform signal generated on the basis of the sub signal generated by the sub processing unit 32, the relay device 3 may transmit (transfer) the skew difference-added main signal received from the CM #0 to the CM #1 without change.

In the CM #1 of the data transmission destination, the transmission signal is input from the relay device 3 to the input port 205b via the lane 223b. The transmission signal input to the input port 205b is input to the receiving unit 201b and the clock extracting unit 202.

The receiving unit 201b stores the main signal included in the transmission signal in the buffer 203b. The main signal stored in the buffer 203b is transmitted to the main processing unit 23 via the output port 206b and the lane 221b. The main processing unit 23 processes the input main signal.

On the other hand, the clock extracting unit 202 extracts the clock signal (the skew difference-added clock signal) from the input transmission signal. The extracted skew difference-added clock signal is input to the phase comparing unit 208 of the reception conversion unit 210.

In the phase comparing unit 208, the phase comparator 2081 compares the reference clock signal with the skew difference-added clock signal, detects the phase shift, and outputs waveform data smoothed by the LPF 2082.

The data converting unit 207b generates the 1-wire serial signal on the basis of the input waveform data, and then generates the sub signal on the basis of the 1-wire serial signal.

The generated sub signal is input to the sub processing unit 22 via the general-purpose bus 222b.

(C) Effects

As described above, according to the storage system 1 which is an embodiment of the present invention, the transmission conversion unit 209 adds the sub signal to the clock-superimposed main signal as the skew difference, and generates the skew difference-added main signal. Then, the delay circuit 204 transmits the generated skew difference-added main signal.

Accordingly, it is possible to transmit the sub signal using the same lanes 223*a* and 223*b* as the main signal, and it is possible to reduce the number of cables used for data transmission. Further, it is unnecessary to provide a dedicated device for transmission of the sub signal, and it is possible to reduce a device cost.

Further, since the sub signal can be transmitted without using the function of the main processing unit 23, for example, even when the main processing unit 23 hangs due to a certain reason, the sub signal can be transmitted.

In the receiving block 200*b*, when the buffer underrun error occurs in the buffer 203*b*, the error detecting unit 211 gives the notification (the second buffer underrun detection notification) to the data converting unit 207*a*. Then, the data converting unit 207*a* prevents the use of the lanes 223*a* and 223*b* in which the buffer underrun error occurs, and transmits the transmission signal using other lanes 223*a* and 223*b* in which the buffer underrun error is not detected. Accordingly, it is possible to reliably receive and process the skew difference-added main signal to be transmitted in the receiving block 200*b* of the switch chip 21 on the reception side.

Further, in the transmitting block 200*a* of its own CM 2, even when the buffer underrun error occurs in the buffer 203*a*, the error detecting unit 211 gives the notification (the first buffer underrun detection notification) to the data converting unit 207*a*. Then, the data converting unit 207*a* prevents the use of the lanes 223*a* and 223*b* in which the buffer underrun error occurs, and transmits the transmission signal using other lanes 223*a* and 223*b* in which the buffer underrun error is not detected. Accordingly, the skew difference-added main signal can be reliably transmitted and processed.

(D) Others

The technology of the disclosure is not limited to the above-described embodiment, and various modifications can be made without departing from the gist of the present embodiment. The components and the processes of the present embodiment can be selected as necessary or may be combined appropriately.

In the above embodiment, the example in which the CM 2 and the relay device 3 are connected by the PCIe communication cable has been described, but the present invention is not limited to this example, and various modifications can be made.

For example, in addition to PCIe, the present invention can be applied to various other bus standards such as InfiniBand as a high-speed serial bus.

In the above embodiment, the receiving block 200*b* includes the buffer 203*b* for each of a plurality of lanes 223*b*, but the present invention is not limited thereto. In other words, when only one lane 223*b* is arranged (when only the lane 0 is arranged), the function of the elastic buffer is unnecessary, and thus it is unnecessary to arrange the buffer 203*b*.

In the above embodiment, the delay circuit 204 generates the skew difference-added main signal in which the main signal of the interval corresponding to HIGH (1) in the sub signal (1-wire serial signal) becomes the half wavelength-shifted state (the half wavelength-delayed state), but the present invention is not limited thereto.

For example, the delay circuit 204 may causes the main signal of the interval corresponding to LOW (0) in the sub signal (the 1-wire serial signal) to become the half wavelength-shifted state (the half wavelength-delayed state).

Further, the delay circuit 204 may causes the main signal of the interval corresponding to HIGH (1) or LOW (0) in the sub signal (the 1-wire serial signal) to become the half wavelength-shifted state (a half wavelength-advanced state).

Further, the delay circuit 204 may cause the main signal of the interval corresponding to HIGH (1) or LOW (0) in the sub signal (the 1-wire serial signal) to becomes a state in which more than a half wavelength is shifted or a state in which less than a half wavelength is shifted, and various modifications can be made. However, it is desirable that an upper limit of the shift amount be less than one wavelength.

Further, the present embodiment can be implemented and manufactured by those skilled in the art on the basis of the disclosure described above.

According to an aspect of the embodiment, the first data and the second data can be transmitted through a simple configuration.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A communication control device that transmits first data and second data, comprising:
   a generating unit that generates phase difference-added first data obtained by adding a phase change according to the second data to a first signal indicating the first data;
   a first generating unit that generates a phase change control signal on the basis of the second data; and
   a transmitting unit that transmits the phase difference-added first data, the generating unit adds the phase change according to the phase change control signal to the first signal.

2. The communication control device according to claim 1, further comprising:
   a receiving unit that receives the phase difference-added first data; and
   a restoring unit that restores the second data from the received phase difference-added first data.

3. The communication control device according to claim 2, wherein the restoring unit restores the second data by generating a waveform signal according to a phase shift between a phase difference-added clock signal to which the phase change is added and a reference signal, generating a second signal indicating the second data by binarizing the waveform signal, and digitizing the second signal, the phase difference-added clock signal being extracted from the phase difference-added first data.

4. A communication control system, comprising:
   a first device; and
   a second device; and
   wherein first data and second data are transmitted from the first device to the second device,
   the first device comprises
   a generating unit that generates phase difference-added first data obtained by adding a phase change according to the second data to a first signal indicating the first data, and a transmitting unit that transmits the phase difference-added first data, and the second device comprises a receiving unit that receives the phase difference-added first data, and a restoring unit that restores the second data from the received phase difference-added first data.

5. The communication control system according to claim 4, wherein the first device further comprises a first generating unit that generates a phase change control signal on the basis of the second data, and the generating unit adds a phase change according to the phase change control signal to the first signal.

6. The communication control system according to claim 4, wherein, in the second device, the restoring unit restores the second data by generating a waveform signal according to a phase shift between a phase difference-added clock signal to which the phase change is added and a reference signal, generating a second signal indicating the second data by binarizing the waveform signal, and digitizing the second signal, the phase difference-added clock signal being extracted from the phase difference-added first data.

7. A communication control device that receives first data and second data, comprising:

a receiving unit that receives phase difference-added first data obtained by adding a phase change according to the second data to a first signal indicating the first data; and a restoring unit that restores the second data from the received difference-added first data.

8. The communication control device according to claim 7, wherein the restoring unit restores the second data by generating a waveform signal according to a phase shift between a phase difference-added clock signal to which the phase change is added and a reference signal, generating a second signal indicating the second data by binarizing the waveform signal, and digitizing the second signal, the phase difference-added clock signal being extracted from the phase difference-added first data.

* * * * *